United States Patent [19]

Douglas

[11] Patent Number: 4,832,886
[45] Date of Patent: May 23, 1989

[54] ABRASION PROCESS FOR THE MANUFACTURE OF MICROPOROUS FILM

[75] Inventor: Noel L. Douglas, Chippewa Falls, Wis.

[73] Assignee: El Paso Products Company, Odessa, Tex.

[21] Appl. No.: 92,499

[22] Filed: Sep. 3, 1987

Related U.S. Application Data

[63] Continuation-in-part of Ser. No. 892,660, Aug. 4, 1986, abandoned.

[51] Int. Cl.⁴ .................. B29C 59/04; B29C 67/20
[52] U.S. Cl. .................................. 264/41; 264/162; 264/DIG. 47; 264/DIG. 70
[58] Field of Search ....... 264/154, 162, 284, DIG. 47, 264/DIG. 70, 41

[56] References Cited

U.S. PATENT DOCUMENTS

| | | |
|---|---|---|
| 3,302,501 | 2/1967 | Greene . |
| 3,718,059 | 2/1973 | Clayton . |
| 4,250,135 | 2/1981 | Arsina . |
| 4,364,985 | 12/1982 | Tokuyama .................. 264/340 |

Primary Examiner—James Lowe
Attorney, Agent, or Firm—Fred S. Valles; Margareta LeMaire

[57] ABSTRACT

A vapor permeable and liquid impermeable microporous film suitable for diaper back sheets and other disposable applications is produced by abrading a filled, unoriented film by passing it through at least one set of at least two cooperating nip rollers, each having an abrasive grit surface.

8 Claims, 1 Drawing Sheet

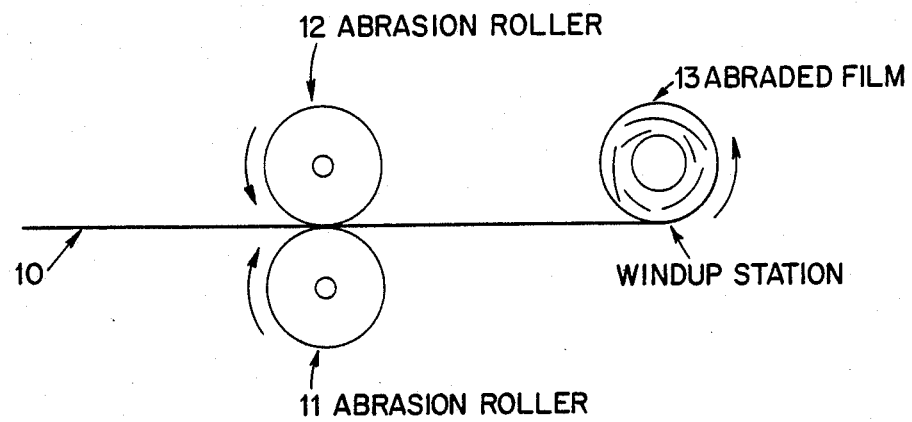

ABRASION PROCESS FOR THE MANUFACTURE OF MICROPOROUS FILM

This application is a continuation-in-part of application Ser. No. 892,660 filed Aug. 4, 1986 now abandoned. It is also related in subject matter to application Ser. No. 92,498 filed concurrently with this application.

BACKGROUND OF THE INVENTION

Porous plastic films can be grouped into two different types: (1) macroporous films which are both vapor and liquid permeable and (2) microporous films which are vapor permeable but impermeable to liquids.

Various processes have been disclosed for the manufacture of porous films of both types, all of them involving the formation of pores or perforations extending through the film from one film surface to the other.

One group of such processes entail the formation of an unfilled thermoplastic resin film and then perforating or piercing the film during its passage through the nip of two rollers. For instance, in the process of U.S. Pat. No. 3,302,501, the piercing objects are pins or needle-like projections extending from the surface of one or both rollers. Other processes utilize pairs of rollers, one of these having a smooth, often heated surface, and the other having either projections in its surface as in U.S. Pat. No. 3,073,304 or an abrasive surface coating as in U.S. Pat. No. 3,718,059. The latter processes have not been entirely successful because of the manufacturing cost of the rollers having surface projections and also because of operational problems causing undesired large variations in the film pore diameters. In addition, the improvements in the moisture vapor transmission rates have been less than desired using the smooth pressure roller techniques.

A second group of such perforation processes employs a differential pressure, e.g., vacuum, between the surfaces of a heated film as the film is passed over a perforated screen, causing the film to be drawn into the openings of the screen and thereby become perforated. Such processes are disclosed in U.S. Pat. Nos. 4,351,784 and 4,456,570. The resulting perforated films are macroporous and are liquid permeable.

A third group of processes accomplish the perforation by first forming a film of an incompatible polymer matrix, either polymer-to-filler as in U.S. Pat. No. 4,472,328 and British Application No. 2,151,538, or incompatible polymer-to-polymer as in Japanese Pat. No. 73-28789, and then stretching the film in one or more directions causing the formation of microtears in the film. Generally, the physical properties, especially the strength and the hydrostatic pressure resistance of the films so produced are not as good as would be desired.

Finally, there is also a process disclosed in U.S. Pat. No. 4,364,985 for preparing a porous microfilled thermoplastic film, wherein the inorganic filler particles are required to have an effective diameter larger than the thickness of the film. Small spaces are formed around the particles and when the filled film is passed over a set of serially positioned abrading rollers for the purpose of rubbing off the surfaces of the film that overlie the outermost portions of the filler particles, there is formed a multitude of fine pores extending from one film surface to the other. This technology has severe extrusion problems due to particle size requirement and hence weak properties.

It is therefore, an object of the present invention to provide a novel process for the production of a microporous filled film which is moisture permeable and liquid impermeable as measured by moisture vapor transmission rate and hydrostatic pressure resistance.

DESCRIPTION OF THE DRAWING

The FIGURE shows a schematic diagram of an embodiment of the process of the present invention.

THE INVENTION

In accordance with the present invention there is provided a process for the production of an unoriented, microporous film which is moisture permeable and liquid impermeable which comprises:

(a) providing an unoriented film made from a blend of a high-molecular weight thermoplastic resin and an inorganic particulate filler, said thermoplastic resin being selected from the group consisting of polyethylene, linear low density polyethylene, polypropylene, polybutylene, ethylene-propylene copolymers and mixtures thereof, the effective average particle diameter of the filler being less than the thickness of the film;

(b) passing the film through at least one set of at least two cooperating nip rollers, each nip roller being provided with an abrasive surface, and (c) recovering from the last set of nip rollers on unoriented, abraded film having an enhanced MVTR while retaining other physical properties including hydrostatic pressure resistance at levels substantially unchanged as compared to the same properties of the film of step (a).

For diaper back sheets and other leak-proof clothing and sanitary applications, a particularly suitable resin is one comprised of from about 65 wt % to about 95 wt % of a low density polyethylene having a density in the range from about 0.910 to about 0.935 gms/cc, and at least 5 wt % of a resin component selected from the group consisting of high density polyethylene having a density exceeding about 0.940, a linear low density polyethylene of a density in the range from about 0.915 to about 0.945 gms/cc, high molecular weight polybutylene and mixtures thereof. The linear low density polyethylene is an interpolymer of ethylene and one or more $C_4$–$C_{12}$ alpha olefins. Especially preferred are the copolymers of ethylene with hexene-1 and/or octene-1. The melt index of the total resin should be between 0.5 and about 10 g/10 min.

The resin composition also contains an inorganic filler, such as calcium carbonate, barium sulfate, mica, titanium dioxide and the like. The concentration of the filler should range between about 5 and about 25 parts by weight per 100 parts by weight of the resin, and the average effective particle size of the filler should be less than the film thickness. Generally, the average particle size is in the range between about 3 and about 30 microns, the thinner the film thickness the smaller the particle size. Preferably, the filler is calcium carbonate.

For appearance, the resin composition usually contains a whitener such as titanium dioxide pigment when titanium dioxide is not the principal filler. The concentration thereof is generally maintained between about 3 and about 16 parts by weight per 100 parts by weight of the resin.

Other additives such as antioxidants, lubricants, stabilizers, etc. may also be added for their known purposes and in conventional quantities.

The film can be produced by any known commercial process, e.g., by casting or blown film techniques. The film thickness should range between about 0.9 mil and about 6 mil. Prior to treatment according to the process of this invention, the film may be subjected to an embossment or other treatment to impart a decorative pattern onto the surface of the film.

The nip rollers have an abrasive surface which is usually provided in the form of coating with an abrasive material such as sand paper, emery cloth, garnet paper, aluminum oxide, etc. The abrasive typically has a grit size ranging between about 80 and about 250 grain. It is not necessary that the entire surface of each of the rollers be covered with the abrasive. The pressure of the nip of the rollers can vary between 10 psig and about 100 psig. The temperature is maintained at ambient conditions.

It is not necessary that a set of the cooperating nip rollers have equal roller diameters, but one roller can have a larger diameter than the other. It is also possible to have one larger roller in cooperative relationship with more than one other abrasive roller of smaller diameter. For instance, the equivalence of five serially positioned nips can be accomplished by passing the film over an abrasive nip roller partially surrounded by and in cooperative relation with five abrasive nip rollers of smaller diameter.

In passing the filled film through a nip section, the rollers crush particles buried in the body of the film and also extract particles from the film surfaces. In the very small spaces where such particles have been crushed or extracted, the effective mass of the polymer is reduced but not to the extent that any significant perforation of the film occurs. The microporous films produced by the process, therfore, exhibit excellent moisture vapor transmission rates while being impermeable to liquids as measured by the hydrostatic pressure resistance. Because no stretching or orientation is required to render the desired porosity, the physical properties are virtually unaffected and remain at desired high levels. Also, the appearance of the film products of the invention as measured by opacity, softness and gloss is very good.

Reference is now had to the FIGURE which schematically depicts an embodiment of the process of the invention.

Film 10 is fed from a supply roll (not shown) through the nip between abrading rollers 11 and 12 at least partially covered with a suitable abrasive. By means of the rotations of the rollers 11 and 12 in opposite directions from each other the abraded film is carried to windup onto rewind roller 13. It is to be understood that various takeoff rollers may be present in the assembly to facilitate the movement of the untreated film to the treated film wind-up station. Also, the invention covers the use of additional sets of cooperating abrading rollers 11' and 12' (not shown) in the process, to provide further improvement in porosity as measured by moisture vapor transmission rate (MVTR).

For a better understanding reference is had to the following example.

EXAMPLE 1

A blend was prepared from 60.5 wt % low density polyethylene (0.924 density, 0.8 MI) 22.3 wt % high density polyethylene (0.967 density, 5.0 MI), 2.0 wt % high molecular weight polybutylene and 8.2 wt % calcium carbonate (particle size of 3 microns) and 7.0 wt % titanium dioxide whitner. A 1 mil cast film was produced from this blend and subsequently embossed to produce a patterned film having a thickness of about 2.2 mil. The embossed film was subjected to abrasion without any stretching or orientation in any direction prior to the treatment. The abrasion treatment was carried out by passing the film 15 times through the nip of two rollers covered uniformly with 80 grit sand paper at a nip pressure of 40 psi. Each of the rollers had a length of 16 inches and a diameter of 3 inches. The speed of each of the rollers was 400 feet per minute and the film passed through the nip at the same rate. The abraded film had a MVTR of about 1000, a 50 fold increase over that of the embossed film before the abrasion treatment. No significant detrimental changes in the other physical properties of the film after abrasion were observed. Table 1 below shows the physical properties of the porous film product of this example:

TABLE 1

| Film Thickness | |
|---|---|
| Initial - mil | 1 |
| Embossed - mil | 2.2 |
| MI - gms/10 min | 4.5 |
| Opacity ASTM D-1003 | 46 |
| Gloss ASTM D-2457 | 4.4 |
| Elongation M.D. - % | 59 |
| T.D. - % | 60 |
| Tensile Strength M.D. - psi | 2955 |
| T.D. - psi | 1100 |
| 1% Secant Modulus M.D. - psi | 16,315 |
| T.D. - psi | 14,215 |
| Tear Strength M.D. - psi | 17 |
| T.D. - psi | 104 |
| Coefficient of Friction | 0.53 |
| Spencer Impact, gms/mil | +45 |
| MVTR gm/m$^2$/24 hours | 1000 |
| Hydrostatic resistance | 40 |

It is to be understood that many alterations and modifications can be made to the process of this invention. All such departures are considered within the scope of this invention as defined by the specifications and appended claims.

What is claimed is:

1. A process for the production of an unoriented microporous film which is moisture permeable and liquid impermeable.
   (a) providing an unoriented film made from a blend of a high molecular weight thermoplastic resin and an inorganic particulate filler, said thermoplastic resin being selected from the group consisting of polyethylene, linear low density polyethylene, polypropylene, polybutylene, ethylenepropylene copolymers and mixtures thereof, the effective average particle diameter of the filler being less than the thickness of the film and ranging between about 3 and about 30 microns, the film having a thickness between about 0.9 and about 6 mils;
   (b) without perforation of the film or causing formation of straight through pores in the film passing the film through at least one set of at least two cooperating nip rollers, each nip roller being provided with an abrasive surface, and
   (c) recovering from the last set of nip rollers an unoriented abraded film having an enhanced MVTR while retaining hydrostatic pressure resistance at levels substantially unchanged as compared to the same properties of the film of step (a).

2. The process of claim 1 wherein the pressure at the nip of the rollers is between about 10 and about 100 psig.

3. The process of claim 1 wherein the abrasive has a grit size between about 80 and about 250 grain.

4. The process of claim 1, wherein the filler of the filled resin composition is selected from calcium carbonate, barium sulfate, mica, titanium dioxide and mixtures thereof in a concentration ranging between about 5 and about 25 parts by weight per 100 parts by weight of the resin.

5. The process of claim 1 wherein the resin composition contains a whitener pigment in an amount ranging from about 3 to about 16 parts by weight per 100 parts by weight of resin.

6. The process of claim 1 wherein the resin is comprised of from about 65 wt % to about 95 wt % of a low density polyethylene having a density in the range from about 0.910 to about 0.935 gm/cc and at least 5 wt % of a resin component selected from the group consisting of high density polyethylene having a density exceeding about 0.940, a linear low density polyethylene having a density in the range from about 0.915 and about 0.945, a high molecular weight polybutylene and mixtures thereof.

7. The process of claim 6 wherein the resin is a blend of low density polyethylene, high density polyethylene and polybutylene.

8. The process of claim 7 wherein the resin composition contains from about 5 to about 25 parts calcium carbonate filler and from about 3 to about 10 parts titanium dioxide whitener per 100 parts resin.

\* \* \* \* \*